June 15, 1926.
A. O. HUBBARD
WAGON
Filed Feb. 23, 1924
1,589,168
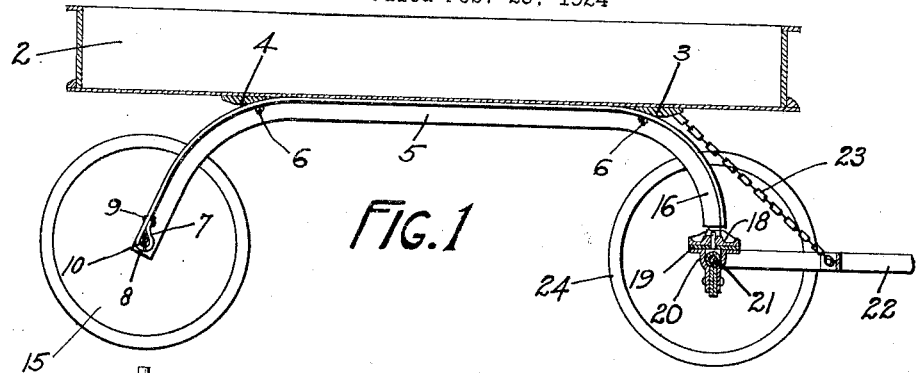
FIG.1
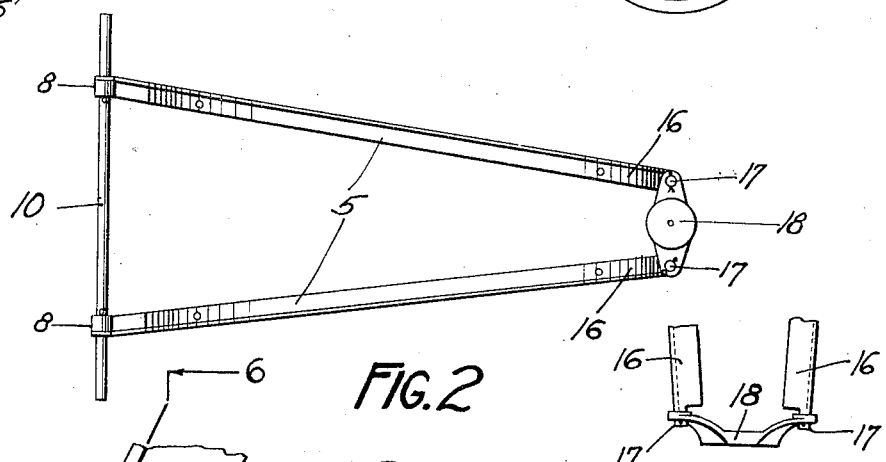
FIG.2
FIG.3
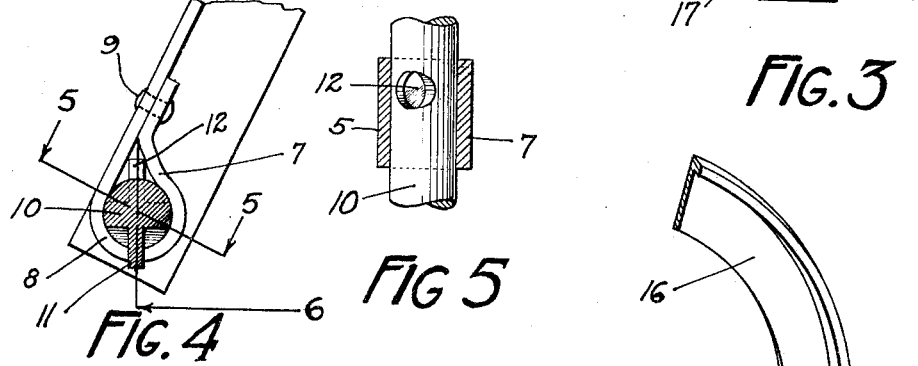
FIG.4  FIG.5  FIG.7
FIG.6
INVENTOR
ARTHUR O. HUBBARD
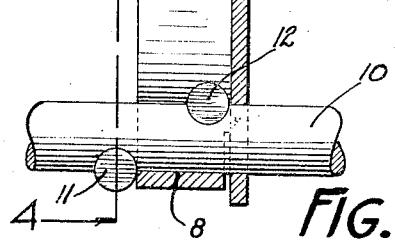
ATTORNEYS Patented June 15, 1926.

1,589,168

UNITED STATES PATENT OFFICE.

ARTHUR O. HUBBARD, OF MINNEAPOLIS, MINNESOTA; NELLIE H. HUBBARD, EXECUTRIX OF SAID ARTHUR O. HUBBARD, DECEASED, ASSIGNOR TO PUFFER-HUBBARD MANUFACTURING COMPANY, OF MINNEAPOLIS, MINNESOTA, A CORPORATION OF MINNESOTA.

WAGON.

Application filed February 23, 1924. Serial No. 694,641.

Wagons of this type as now generally constructed, employ a number of brackets or braces around the front and rear axles involving the use of bolts, rivets, washers and nuts to such an extent that the cost of manufacturing under present labor conditions is materially increased.

The object of the invention is to provide a strong, rigid connection between the forward and rear axle with a minimum of parts and at the same time providing a strong durable housing for the axle connections and eliminating all brackets and fastening means therefor, heretofore considered necessary or essential in the manufacture of a wagon of this type.

Other objects of the invention will appear from the following detailed description.

The invention consists generally in various constructions and combinations all as hereinafter described and particularly pointed out in the claims.

In the accompanying drawings,

Figure 1 is a longitudinal sectional view through a wagon embodying my invention;

Figure 2 is a bottom view of the reaches and rear axle with the wagon-box removed;

Figure 3 is a detail of the connection between the forward ends of the wagon reaches and the forward axle;

Figure 4 is a detail sectional view showing the manner of mounting the rear axle in the rear portion of the reaches on section line 4—4 of Figure 6;

Figure 5 is a sectional view on the line 5—5 of Figure 4;

Figure 6 is a sectional view on the line 6—6 of Figure 4, and

Figure 7 is a detail view of the forward end of one of the reaches.

In the drawing:

2 represents the wagon-box having on the under side thereof, at the front and rear, suitable crossbars 3 and 4. 5 represents the wagon reaches, each made preferably of angle bar metal having their forward and rear ends downwardly turned and with substantially straight middle portions with the horizontal flanges of the bars seated against the under side of the wagon-box and secured thereto by suitable means such as bolts 6.

Generally in this type of child's wagon construction there are crossbars along the middle portion of the box on the under side for supporting and bracing the box at this point and between the box and the front and rear axles, braces or brackets with the necessary bolts are provided, adding to the cost of the wagon and the labor required to install or mount the braces or brackets and bolts increasing such expense. By using the form of reach bar shown herein, I utilize their middle portion to brace and support the bottom of the wagon-box while the downwardly turned ends have all the function of the separate braces heretofore employed in supporting the front and rear axles and at the same time eliminate many parts and materially reduce the cost of manufacture and upkeep. This construction enables me to dispense with the brackets or braces usually provided between the front and rear axles and the wagon-box and the bolts, washers, etc., incidental or necessary for securing these braces, and I am thus able to effect a saving in the amount of material used and particularly in the labor of assembling the wagon. The reaches diverge from the front to the rear and the horizontal flange of each reach preferably is cut away to form a strap 7 that is folded back upon itself to form a bearing 8, the end of the strap being secured to the vertical flange at on side of the bearing by suitable means such as a rivet 9, a suitable hole being provided in the vertical flange to receive the rivet. The rear axle 10 has its ends inserted into the bearings 8 and lugs 11 are pressed out of the axle to contact with the bearings on the inner side thereof and hold the shaft against outward movement in either direction. Similar lugs 12 are pressed out of the axle to fit into the angles between the ends of the straps 7 and the horizontal flanges of the reaches for the purpose of preventing the axle from turning in its bearings.

When the reach bars have been placed on the ends of the axle, the loop bearings 8 will contact with the lugs 11 and endwise movement of the axle in either direction will be prevented. I thus provide by a simple, inexpensive method, a strong, durable axle bearing and one that is well adapted for a vehicle of this kind. The ends of the axle project outwardly beyond the reaches a sufficient distance to allow the rear wheels 15 to be conveniently mounted thereon.

The forward ends of the reaches have downwardly turned portions 16 terminating in studs 17 adapted to fit within holes in a plate 18 having a disk-like middle portion that rests upon the flange 19 of the truss plate 20 in which the forward axle 21 is mounted. The studs 17 are at the intersection of the flanges of the bar and are formed preferably by cutting the flanges transversely and then rolling the severed portions toward the junction of the flanges to form the studs. This is a very simple, inexpensive way of making the stud and eliminates the necessity of providing separate pieces and securing them to the ends of the reaches. I thus provide a steel frame of angle bar capable of resisting any stress to which it may be subjected, supporting the forward and rear axles and the wagon-box in a very substantial manner with only three members or separate pieces between the box and the axles. A suitable tongue 22 is connected to the forward axle and held against tilting downwardly too far by suitable means such as a flexible connection 23.

The forward wheels 24 are mounted upon the forward axle and support the forward portion of the wagon in the usual manner. The angle bar reaches may be made of any suitable gauge of metal and their horizontal flanges fitting snugly against the bottom of the box form a substantial support therefor and for any load that may be in the box; the arch-like construction of the reaches transmitting this load directly to the axles and supporting wheels and the downwardly turned ends being of such a rigid character that no supporting or bracing means therefor is necessary.

I claim as my invention:

1. The combination with a child's wagon-box, of angle bar reaches secured to the under side thereof and having downwardly turned rear ends, one flange of each downwardly turned rear end being folded back upon itself to form a loop bearing, and a rear axle fitting within said loop bearing and supported thereby.

2. The combination with a wagon-box, of flanged reaches secured to the under side thereof and having downwardly turned rear ends, one flange of each downwardly turned rear end being folded back upon itself to form a loop bearing, and a rear axle fitting within said loop bearing and supported thereby, and said axle having means thereon preventing its longitudinal movement in said bearing and rotary movement with respect thereto.

3. The combination with a wagon-box reach having downwardly turned flanged rear ends, one of the flanges of said ends being folded back upon itself to form a loop bearing, an axle fitting within the loop bearings of said reaches and having lugs pressed therefrom to engage said reaches and limit endwise movement of said shaft, and said shaft also having lugs pressed therefrom to enter the loops of said reaches and prevent rotary movement of said shaft therein.

4. The combination with a wagon-box reach having downwardly turned forward ends, said ends being shaped to form integral studs, a plate having holes therein to receive said studs, a forward axle and housing therefor and said housing having a centrally formed plate whereon the plate of said reaches is seated.

5. The combination with a wagon-box, of reaches composed of angle bar metal secured to the under side of said box and having downwardly turned forward ends, the lower ends of said reaches having their flanges cut transversely toward the junction of said flanges, the partially severed end portions of said flanges being rolled inwardly to form depending studs in the angle of said bars, and a forward axle having means for engaging said studs.

6. The combination with a wagon-box and forward and rear axles and wheels therefor, of reaches connecting said axles with said box, the rear ends of said reaches having axle bearings formed therein by folding a strap portion of the reach over upon itself to form a loop, the rear axle having lugs formed thereon to contact with said loops and prevent endwise movement of the axle when the parts are assembled, and the ends of the axle projecting beyond the bearing loops on each side and fitting the hubs of the rear wheels.

In witness whereof, I have hereunto set my hand this 13th day of February, 1924.

ARTHUR O. HUBBARD.